United States Patent
Garimella et al.

(10) Patent No.: US 12,277,851 B2
(45) Date of Patent: Apr. 15, 2025

(54) PERSONAL PROTECTIVE EQUIPMENT COMPLIANCE AND PERSONAL WELLNESS MONITORING SYSTEMS AND METHODS WITH INTELLIGENT SENSOR UNITS AND PROXIMITY SENSING

(71) Applicant: Eaton Intelligent Power Limited, Dublin (IE)

(72) Inventors: Srinivas Surya Katya Kanaka Garimella, Pittsburgh, PA (US); Mihir Garimella, Pittsburgh, PA (US)

(73) Assignee: Eaton Intelligent Power Limited, Dublin (IE)

( * ) Notice: Subject to any disclaimer, the term of this patent is extended or adjusted under 35 U.S.C. 154(b) by 71 days.

(21) Appl. No.: 18/248,001

(22) PCT Filed: Oct. 5, 2021

(86) PCT No.: PCT/EP2021/025385
§ 371 (c)(1),
(2) Date: Apr. 5, 2023

(87) PCT Pub. No.: WO2022/073639
PCT Pub. Date: Apr. 14, 2022

(65) Prior Publication Data
US 2023/0377445 A1    Nov. 23, 2023

Related U.S. Application Data (60) Provisional application No. 63/087,557, filed on Oct. 5, 2020.

(51) Int. Cl.
G08B 21/22     (2006.01)
G08B 5/36      (2006.01)
(Continued)

(52) U.S. Cl.
CPC ............... *G08B 21/22* (2013.01); *G08B 5/36* (2013.01); *G08B 21/02* (2013.01); *G08B 25/016* (2013.01); *G08B 25/10* (2013.01); *H04B 17/318* (2015.01)

(58) Field of Classification Search
CPC .......... G08B 21/22; G08B 5/36; G08B 21/02; G08B 25/016; G08B 25/10; G08B 21/14; H04B 17/318
See application file for complete search history.

(56) References Cited

U.S. PATENT DOCUMENTS 6,868,360 B1    3/2005  Olstad
2014/0173439 A1* 6/2014  Gutierrez ............... H04L 43/10
                                                          715/738
(Continued)

FOREIGN PATENT DOCUMENTS

GB    2571118 A       8/2019
WO    WO 2017181036 A1  10/2017

OTHER PUBLICATIONS

International Search Report and Written Opinion for International Application No. PCT/EP2021/025385 mailed on Jan. 24, 2022, 14 pages.

(Continued)

*Primary Examiner* — Brian Wilson
(74) *Attorney, Agent, or Firm* — Baker Botts L.L.P.

(57) ABSTRACT

Monitoring systems and methods incorporating wearable personal protection items with intelligent sensor units configured to communicate with one another and determine proximity of individuals to one another while also monitoring personal wellness and safety protocol compliance across a community of persons.

20 Claims, 3 Drawing Sheets

(51) Int. Cl.
  *G08B 21/02*   (2006.01)
  *G08B 25/01*   (2006.01)
  *G08B 25/10*   (2006.01)
  *H04B 17/318*  (2015.01)

(56) References Cited

U.S. PATENT DOCUMENTS

| | | | |
|---|---|---|---|
| 2015/0170493 A1* | 6/2015 | Beggs | B66F 17/003 |
| | | | 340/539.11 |
| 2017/0215811 A1* | 8/2017 | Newberry | A61B 5/14551 |
| 2017/0372216 A1 | 12/2017 | Awiszus | |
| 2021/0058736 A1* | 2/2021 | Ghazzaoui | H04W 4/80 |
| 2021/0314729 A1* | 10/2021 | Morgenthau | H04B 17/23 |
| 2022/0050199 A1* | 2/2022 | Waldron | G06F 18/22 |
| 2022/0078575 A1* | 3/2022 | Raveendran | H04L 67/535 |

OTHER PUBLICATIONS

Chandel, et al., "ProxiTrak: a robust solution to enforce real-time social distancing & contact tracing in enterprise scenario", UbiComp/ISWC '20 Adjunct: Adjunct Proceedings of the 2020 ACM International Joint Conference on Pervasive and Ubiquitous Computing and Proceedings of the 2020 ACM International Symposium on Wearable Computers Sep. 2020, pp. 503-511. https://doi.org/10.1145/3410530.3414599.

* cited by examiner

PERSONAL PROTECTIVE EQUIPMENT COMPLIANCE AND PERSONAL WELLNESS MONITORING SYSTEMS AND METHODS WITH INTELLIGENT SENSOR UNITS AND PROXIMITY SENSING

BACKGROUND OF THE INVENTION

The field of the invention relates generally to computer-implemented personal protective equipment monitoring systems, and more specifically to personal protective equipment monitoring systems including intelligent wearable personal protective equipment items that are configured to wirelessly communicate with one another, assess personal wellness of the wearer, and detect non-compliance with personal protective equipment protocols.

A variety of different types of Personal Protective Equipment (PPE) exist that workers are required to use in a host of healthcare, industrial, utility, and professional trades to provide a degree of protection to workers from known risks in hazardous environments. Enhanced worker safety in otherwise hazardous environments can be desirably realized when PPE is utilized with appropriate and detailed safety protocols defining the specific items of PPE (e.g., protective suit, faceshield, gloves, etc.) and also for the proper use thereof in certain environments or for performing certain tasks within such environments.

Effectively overseeing the proper use of PPE by personnel in a hazardous environment presents practical challenges. While conscientious and well-trained workers typically follow PPE protocols successfully, some degree of inattentiveness and mistake is inevitable across a large population of workers performing tasks over an extended period of time, with potentially severe consequences. Also, the personal wellness of workers may contribute to success or failure to comply with protocols to safely complete tasks, as unwell workers may be more prone to distraction and mistake. In some cases, personal wellness may be part of the safety protocols in place to discourage unhealthy employees from performing certain tasks, but to some extent workers personal wellness is entirely subjective and workers may therefore not be cognizant of health issues or may overestimate their ability to overcome them. Achieving a healthy workforce and compliance with applicable PPE protocols is therefore an ongoing concern from the safety perspective, and intentional or unintentional violations of PPE protocols that compromise the desired safety protocols can often be difficult to detect across a number of workers in different areas performing different tasks.

Computer-implemented monitoring systems exist that intelligently incorporate sensors in items of PPE to create a degree of situational awareness of risks posed to groups of workers, but known systems of this type generally lack capability to detect specific PPE compliance issues and wellness issues associated with particular individuals in the group. Improvements are therefore desired.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

In order to understand the inventive concepts described below to their fullest extent, set forth below is a discussion of the state of the art and certain longstanding problems pertaining to personal wellness and PPE compliance, followed by systems, devices, and methods addressing longstanding problems in the art.

It is a practical reality in certain industries that exposure of at least some workers to hazardous or potentially hazardous working conditions cannot be avoided. As one example, workers in the electrical industry, and more specifically those working in and around energized electrical power systems, must be trained in the appropriate use of PPE to mitigate possible electrical hazards with which they may face. Aside from hazards associated with electrical shock and electrocution, electrical arc flash incidents are of particular concern.

Electrical arcing, or current flow between two or more separated energized conductors, may be experienced when installing, servicing, and maintaining electrical power systems. Arcing may occur from electrical fault conditions and can release significant amounts of concentrated radiant energy at the point of arcing in a fraction of a second, resulting in high temperatures that may burn persons exposed to them. Additionally, arcing conditions may produce pressure blasts that are more than sufficient to knock nearby workers off their feet, and shrapnel may be generated by the pressure blasts imposing additional hazards to workers.

Further, arcing in an electrical power system may suddenly arise in various scenarios that cannot be reliably predicted. For example, insulation failure of components used in electrical systems, including but not limited to cables that interconnect electrical components and equipment, may precipitate arcing, as well as a build-up of dust, impurities and corrosion on insulating surfaces. Sparks generated during operation of circuit breakers, during replacement of fuses, and closing electrical connections on faulted lines may also produce an arc. Damage to components and equipment from rodents and pest infestations may likewise result in arcing conditions. Finally, arcing may be the result of unpredictable human error such as inadvertently dropping a tool onto energized conductors, accidental or incidental contact with energized components or equipment, and improper work procedures or mistake in following a procedure to complete a task. Safe completion of certain tasks requires a great deal of care and focus on the proper procedures that in some cases may be inherently difficult and stressful exercise on a good day, while additional distraction or lack of focus of a worker who is unwell tends to increase a likelihood of human error.

PPE that is adequate or sufficient to provide at least a minimum level of protection to persons against potential electrical hazards has been developed for practically the entire human body to mitigate instances of electric shock, arc flash and arc blast. Persons wearing such PPE may be reasonably protected from incidental contact with energized conductors and potentially hazardous arc flash incidents and such PPE may avoid or reduce the likelihood of serious injury if such an arc flash incident occurs. Examples of PPE items may include a head covering such as a hard hat, a face covering or faceshield, a flame resistant neck protector, ear protectors, a Nomex™ suit or protective body garment covering the wearer's torso and limbs, insulated rubber gloves with leather protectors, and insulated leather footwear. Insulated tools may also be provided to complete certain tasks. Such PPE items may be fabricated from various materials to provide, among other things, thermal insulation protection to prevent severe burns to human flesh during high temperature arcing conditions, and to mitigate pressure blasts and shrapnel to avoid life-threatening wounds to a worker's head and torso if arcing conditions were to occur. Different grades of PPE are available to protect against varying degree of risk presented. For example, in the case of electrical fuses that need replacement under energized circuit conditions, fuses of higher electrical ratings may pose a greater risk to workers than fuses of lower electrical ratings, and different amounts or types of personal protective equipment may be required for replacing one fuse, for example, than for replacing another fuse in view of different risks that are presented.

Similar considerations exist for other types of hazardous environments rendering similar PPE items desirable for use such as, for example only, petroleum refineries, petrochemical plants, grain silos, wastewater and/or treatment facilities, or other industrial facilities in which sustained or volatile conditions in the ambient environment may be present and with a heightened risk of fire or explosion and/or a potential exposure to caustic chemicals and substances or very hot materials presenting risks of severe burns. Various different grades of PPE are available for such risks, which may be similar to or different from the grades of PPE designed for electrical hazards, to meet the different risks posed by different situations.

In the healthcare environment, PPE items have been used to protect doctors and nurses in the treatment of patients having conditions that present health risks to healthcare providers when performing certain procedures. Different grades of PPE are available to meet different risks posed by different healthcare procedures. Paramedics, Emergency Medical Technicians (EMTs), Law Enforcement Offices, Firefighters and other emergency responders, as well as military personnel also have PPE items and protocols for responding to certain situations.

Wherever needed, PPE items are subject to appropriate and detailed safety protocols defining their use. Such protocols may detail specific items of PPE (e.g., protective suit, faceshield, gloves, etc.) needed for certain environments or for certain tasks within such environments, processes for obtaining the proper grade of PPE where multiple grades are available, processes for when such PPE items are required to be worn, processes for how such PPE items must be adorned and used, and processes for how PPE should be removed and cleaned for subsequent use. A number of practical challenges exist, however, in effective oversight of the proper use of PPE by personnel in a hazardous environment. Conscientious and well-trained workers will dutifully follow PPE protocols, but occasional misunderstanding, carelessness, and mistake may nonetheless occur with potentially severe consequences. Ensuring compliance, or detecting non-compliance, with applicable PPE protocols is therefore an ongoing concern.

For instance, a worker may have access to the proper PPE items to mitigate safety risks, but may nonetheless improperly use a PPE item in a non-compliant and therefore risky way. In the case of a faceshield for example, a user may temporarily remove his or her faceshield in a hazardous location, and present much risk in doing so without necessarily realizing it, or may forget to put the faceshield on at the required point of the procedure. Such incidents are very difficult to detect in order to allow an overseer of management of the facility to take proactive steps such as discipline or additional training for affected workers that are violating PPE protocols. Likewise, in the case of a positionable faceshield that is selectively operable in an "up" position away from one's face or a "down" position covering one's face, the faceshield may inadvertently be in the wrong position (i.e., up instead of down) when performing a hazardous task, again presenting risk without the worker necessarily realizing it. Such incidents too tend to be very difficult to detect, and management therefore generally lacks opportunity to take appropriate actions to address issues concerning PPE compliance, especially for workers performing tasks alone.

While a protocol for some procedures may require a group of persons to perform tasks together such that any PPE non-compliance can be witnessed and reported by another worker, this is not always a reliable safeguard. Different workers may approach compliance issues from various perspectives that render compliance assessment subjective rather than objective. Certain workers may be reluctant to report non-compliance by co-workers, or may fail to recognize or understand that a compliance violation had actually occurred. In a rarer case, a worker or a group of workers may knowingly disregard aspects of a protocol that are deemed to be too onerous or restrictive.

Unless reliably and consistently detected, intentional or unintentional violations of PPE protocols may occur indefinitely to undermine important safety considerations, and across a number of workers in different areas performing different tasks in hazardous locations the challenges to oversee PPE compliance and detect non-compliance are multiplied. Smart, computer-implemented monitoring systems exist in the industrial realm that intelligently incorporate sensors in items of PPE to create a greater degree of situational awareness of worker safety across groups of workers, but known systems of this type generally lack a focus on evaluating specific PPE compliance issues of the type described above.

The onset of novel coronavirus SARS-CoV-2, also commonly referred to as COVID-19, has raised new concerns and demands for the proper use of PPE and compliance with PPE protocols in environments that prior to COVID-19 were generally not considered "hazardous" in a manner that demonstrated a prior need for PPE. Such environments include areas of industrial facilities that are isolated from conventionally defined hazards, healthcare facilities and areas of healthcare facilities that were not previously considered to present high risk scenarios, elementary schools, middle schools, high schools, colleges and universities, offices and businesses of all types, shops and retail establishments, dining establishments, churches, entertainment venues, etc. Desirable PPE items are therefore prolifically present in these environments as a means to protect workers from COVID-19, but still are subject to improper or non-compliant use in ways that are difficult to predict or control.

In the COVID-19 era, individual personal wellness is an important consideration to ensure that no transmission of the virus occurs to nearby persons. In general, persons having COVID-19 symptoms are strongly advised not to closely interact with other persons if possible but instead to distance and isolate themselves to the point of quarantine, but in some instances a person may have symptoms without necessarily realizing it. Temperature checks upon entry to a designate area are sometimes conducted as a course filter for screening purposes for personal entry to a space where other persons are present, but such temperature checks are limited in important aspects. For instance, persons who passed the temperature check upon entry may develop a fever or other symptoms after the temperature check was made. In certain cases COVID-19 illness or other illnesses may rapidly develop and may suddenly impair a person considerably, so early detection of symptoms can be important but are unfortunately rare. Especially so for persons that happen to be operating in a conventionally hazardous environment when a debilitating illness or health condition strikes, inability to detect such issues quickly may have significant undesirable consequences. Existing COVID-19 protocols and electronic tools are generally reactive by nature rather than being proactive in such aspects.

Social distancing and face coverings are another considerations to address risks posed by other persons possibly having the COVID-19 virus or other conditions that can be contagiously spread or communicated to others. Faceshields are known and effective to meet the face covering requirements, but for the reasons above are subject to misuse that can defeat the virus protection desired. Proximity sensing and contact tracing technologies have emerged to monitor social distancing aspects and collect information that may be helpful to maintain an outbreak of illness, but they are disadvantaged in some aspects for certain hazardous environments. For instance, smart-phone based contact tracing apps are of no aid in environments wherein smart phones are prohibited for safety reasons. Known contact tracing apps also operate independently of PPE systems and lack capability to assess wellness in a proactive manner.

For the reasons above, effective PPE monitoring systems are needed to more intelligently address PPE compliance with protocols that are COVID-19 related and non-COVID related but nonetheless implicate important wellness and PPE compliance concerns to varying degrees.

Exemplary processor-based sensor systems, devices and methods are described herein that include embedded sensor technology in wearable personal protective equipment devices. Combinations of different types of sensors are provided in intelligent wearable PPE items worn by different persons to be monitored. The intelligent wearable PPE items are configured to wirelessly connect and communicate with one another in a population of persons wearing the intelligent PPE items and also to a remote centralized system that aggregates data for review, analysis and oversight or individual personal wellness and PPE compliance issues in an objective and reliable manner allowing proactive management of health and safety risks in a community of persons. Technical effects achieved by the devices, systems, and processes include enhanced PPE compliance and personal wellness monitoring via combinations of different types of sensors that are provided in intelligent wearable PPE items worn by different persons to be monitored, with a specific view to evaluating desired proximity limits in to addition personal wellness monitoring.

In important aspects, the combination of sensors provided in each intelligent wearable PPE item in the system of the present invention are operable in combination to provide signal inputs that may be processed and analyzed to collectively assess the wellness of the person wearing each intelligent PPE item, sense a proximity of each person wearing an intelligent PPE item to another person wearing an intelligent PPE item, assess compliant use of the PPE item by each wearer, provide feedback indicators to sensed parameters to persons wearing intelligent PPE items, record contact tracing information, and output data and information to a remote device that can be accessed by overseers via informational dashboard displays. Proactive steps may be taken by overseers to quickly and proactively respond to detected issues to minimize risks presented to a community of persons wearing the intelligent PPE items.

In a contemplated example, an intelligent wearable PPE item according to the present invention may be provided in the form of a headband equipped with a faceshield, although other types wearable PPE items such as those described above may likewise be provided in addition to or in lieu of headbands and faceshields as desired with similar intelligent features. By virtue of a set of biometric sensors that are located proximate the head of wearer when the headband and faceshield is worn, the sensors can detect wellness of the wearer and an onset of COVID systems (e.g., fever or shortness of breath) and other health impairments that could present risk to others or affect an ability of the person to successfully complete hazardous tasks, The set of biometric sensors can also utilized to detect and determine wellness aspects such as whether a person wearing the headband and faceshield has fainted or has fallen down and needs assistance, and PPE compliance aspects such as whether a person has removed the headband or faceshield or is otherwise using them in an improper way that defeats desired safety objectives. Output signals may be generated by the processor to provide feedback signals to detected health conditions via activation of LED lights for example that may be observed by the wearer or other nearby persons. Activation of such lights may provide notice of personal health issues and possible risks that would otherwise not be detected by the persons wearing the intelligent PPE items. Wellness information and detected events may in some cases be recorded and stored by the processor in some embodiments in a manner that ensures personal anonymity in the data collected and such information may be communicated to a remote system for system archiving, analysis and reporting purposes.

Also, in contemplated examples the headband and faceshield includes a low power communications device in the form of a Bluetooth transceiver that may communicate with other Bluetooth transceivers in wearable PPE items. Based on Received Signal Strength Indication (RSSI) considerations of the Bluetooth transceivers, the distance between the persons wearing the intelligent PPE items can be deduced. Based on such RSSI considerations, when persons who are determined to be distanced by less than a predetermined amount (e.g., six feet) output signals may be generated by the processor in each PPE item to provide feedback signals to warn each person of a proximity violation that they can quickly correct. Proximity violation information may be recorded by each processor to provide effective contact tracing when needed.

The sensor and monitoring system of the invention is equally applicable to any of the areas listed above, or other areas that present similar issues or concerns, which are deemed hazardous in a non-conventional way solely because of COVID-19 issues or other pandemic or epidemic outbreaks that compel a use of PPE and/or conventional areas deemed hazard in a conventional way due to risks such as shock, blasts, impact, fire, explosion, chemical burns, exposure to high temperatures, and all sorts of other undesirable exposure to potentially harmful elements.

The inventive concepts will now be explained in detail in relation to exemplary embodiments illustrated in the accompanying Figures in which like features are indicated with like reference characters throughout. Method aspects will be in part apparent and in part explicitly discussed in the following description.

Figure 1:
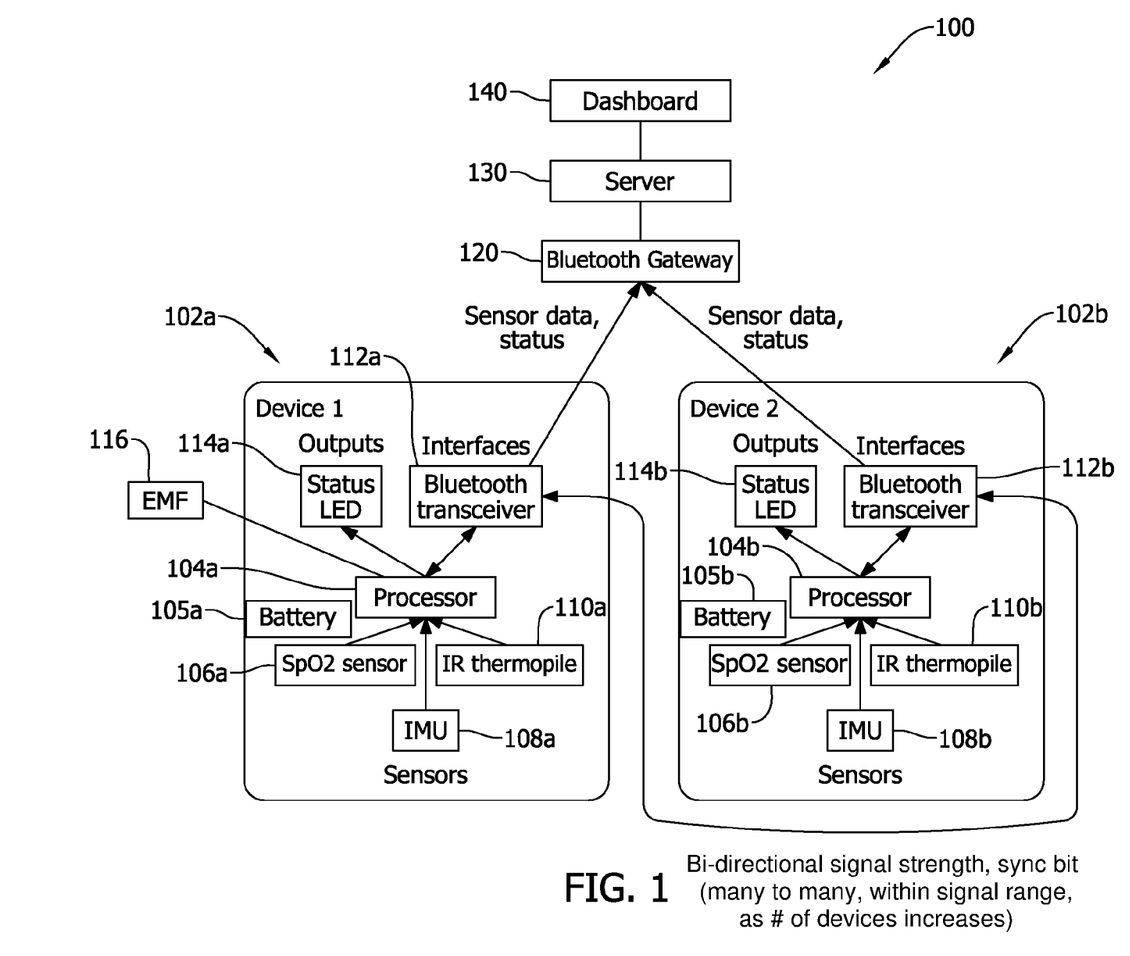
FIG. 1 is a schematic illustration of a PPE monitoring system architecture according to an exemplary embodiment of the present invention.

FIG. 1 is a schematic illustration of an exemplary architecture of a PPE monitoring system 100 addressing and overcoming the issues and concerns described above and therefore realizing significant benefits. The system 100 as shown includes a first processor-based sensor unit 102a and a second processor-based sensor unit 102b that are respectively embedded in different items of PPE that are worn by different persons being monitored. The sensor units 102a, 102b in contemplated embodiments are provided in headband and faceshield PPE items as described further below, although they could alternatively be provided in other types of wearable items such as those described above with similar benefits.

Each processor based sensor unit 102a, 102b in the example shown is of the same type and configuration featuring a processor-based control element in the form of a "processor" 104a, 104b in FIG. 1 although variations are possible in this regard. As used herein, the term "processor-based" shall refer to computers, processors, microprocessors, microcontrollers, microcomputers, programmable logic controllers, reduced instruction set (RISC) circuits, application specific integrated circuits and other programmable circuits, logic circuits, equivalents thereof, and any other circuit or processor capable of executing the functions described below. The above examples are exemplary only, and are thus not intended to limit in any way the definition and/or meaning of the term "processor-based device".

In the illustrated example, the processor based control in each sensor device 102a, 10b is implemented in a microcomputer or other processor 104a, 104b, and a memory that stores executable instructions, commands, and control algorithms, as well as other data and information required to satisfactorily operate the system as explained below. The memory of the processor-based device may be, for example, a random access memory (RAM), although other forms of memory could be used in conjunction with RAM memory, including but not limited to flash memory (FLASH), programmable read only memory (PROM), and electronically erasable programmable read only memory (EEPROM).

The processors 104a, 104b are powered by on-board power supplies such as batteries 105a, 105b in each unit 102a, 102b, and the batteries may be rechargeable in some embodiments. Multiple batteries may be provided and managed by the processors 104a, 104b to provide redundant back-up power capability if a problem were to occur with one of the batteries or when one of the batteries becomes discharged. The processors 104a, 104b may accordingly track the battery charge levels in use, report the battery charge data and information with other information described below, and issue alerts and notifications to PPE item wearers and overseers when available battery power falls below predetermined limits.

The processors 104a, 104b receive signal inputs from biometric sensors such as an oximeter sensor 106a, 106b, and inertial measurement unit (IMU) 108a, 108b and an infrared (IR) thermopile sensor 110a, 110b respectively monitoring physiological parameters of the wearer when a PPE item including the sensor devices 102a or 102b is being worn. The sensors 106a, 106b, 108a, 108b, 110a, 110b may receive power directly from the power supply batteries or indirectly through the processors 104a, 104b that may be configured with power management features to increase battery life. In some embodiments, one of more of the sensors 106a, 106b, 108a, 108b, 110a, 110b could include its own power supply.

The oximeter sensors 106a, 106b are configured to monitor blood oxygen saturation levels commonly referred to as SpO2 wherein 'S' indicates saturation, p indicates pulse, and 02 indicates oxygen. The oximeter sensors 106a, 106b in contemplated examples are known optical sensor devices that provide an Sp02 measurement, typically expressed as a percentage, that indicates how effectively a person is breathing and how well blood is being transported throughout the body. An average SpO2 reading for a normal, fit adult is 96%. The processors 104a, 104b can accordingly monitor the sensors 106a, 106b and compare their outputs to predetermined thresholds to assess wellness of a person in the SpO2 aspect.

If the measured SpO2 falls below a predetermined threshold, an alert and notification can be generated to the PPE item wearer and to others of a possible health condition that may require intervention or assistance. Abrupt or unexpected changes in measured SpO2 may also trigger alerts and notifications by the processors 104a, 104b concerning wellness of the PPE item wearer. Likewise, a sudden loss of Sp02 measurement may indicate a PPE compliance event wherein the wearer has removed the PPE item including the sensors 106 or 106b. In other words, by virtue of the Sp02 measurements the processors 104a, 104b can intelligently determine whether or not the PPE items are actually being worn, and record periods of time in which the PPE items are not being worn.

The SpO2 sensors 106a, 106b in certain embodiments may be switched on an off by the processors 104a, 104b at periodic intervals so that the processors 104a, 104b receive a sampled series of SPO2 measurements over time with reduced energy consumption and longer battery life. In another embodiment, the sensors 106a, 106b may be continuously operated if desired but with increased energy consumption and shorter battery life.

The inertial measurement units (IMUs) 108a, 108b are known sensor devices that measure movement of the PPE item containing the sensor units or devices 102a, 102b. Since the sensor units 102a, 102b are in wearable PPE items, the sensors 108a, 108b in turn measure the movement of a person when the PPE item is being worn. Each IMU sensor 108a, 108b includes a set of sensor elements such as an accelerometer which measures velocity and acceleration, a gyroscope that measures rotation and rotational rate, and a magnetometer that establishes a directional heading of movement. The processors 104a, 104b receiving such measurements from the IMUs 108a, 108b can therefore intelligently track the position and movement of the PPE item (and corresponding movement of a person) and look for unexpected measurements that may require alerts and notifications to be generated. For instance, the IMU measurements may reflect a short but sudden and unexpected acceleration that could indicate a fall or loss of consciousness of a worker, an impact or blast indicating an accident with possible injury, a worker that is unexpectedly running and may be in distress or responding to an emergency event, or other wellness-based events.

The IMU measurements may also be beneficially assessed to detect PPE compliance issues such as an unexpected lack of movement if a worker removes a wearable PPE item in an unauthorized manner and puts the item down. The IMU measurements can also be calibrated to detect certain signatures corresponding to PPE movement and position relative to the person wearing it. For example, an IMU associated with a faceshield may be recognized by the processors 104a, 104b in an "up" or "down" position and therefore can intelligently determine whether the faceshield is up or down and when it was changed from up to down or vice versa. The IMUs may also facilitate a detection of a person in an unauthorized location and other events of interest that may otherwise have gone undetected.

The sensors 110a and 110b are known infrared thermopiles that measure the body temperature of the person wearing the PPE item. Predetermined limits can be set for the processors 104a, 104b to measure body temperature and confirm that the person has a normal temperature within a range of expected temperature, an elevated temperature (i.e., fever) above a normal temperature range corresponding to an illness, or a failure to record an expected temperature corresponding to a compliance event wherein the person is not wearing the PPE item. When applied to a faceshield, a temperature sensor 110a or 110b may also assist in determining whether the faceshield is in up or down position. The up position will generally be expected to fail measure the wearer's body temperature at all since the faceshield is not proximate the user's face, while the down position will facilitate a body temperature measurement.

In combination, the sensors 106a, 106b, 108a, 108b, 110a and 110b provide seamless evaluation of personal wellness and PPE compliance monitoring in a sophisticated manner. The sensors 106a, 106b, 108a, 108b, 110a and 110b provide some redundancy in feedback signals that in combination can be used in a corroborating manner to intelligently confirm detection events or identify error conditions. For example, when the sensors 106a, 106b indicate normal Sp02 measurements, the sensors 108a, 108b indicate normal expected movement and position, and when the sensors 110a and 110b indicate expected temperatures they provide three different points of reference that the PPE items including the sensors are actually being worn by a person. Likewise, when the sensors 106a, 106b indicate no Sp02 measurements, the sensors 108a, 108b indicate no expected movement and position, and when the sensors 110a and 110b indicate no expected temperatures they provide three different points of reference that the PPE items including the sensors are not actually being worn. From a power management perspective, if it is detected that the respective PPE item is not being worn, the sensor units may be powered down or enter a sleep state to prolong battery life, while the sensor units 102a, 102b may wake up and resume normal operating power when the sensors 106a, 106b, 108a, 108b, 110a and/or 110b once again indicate that the PPE item is being worn.

As a further example, when the sensors 106a, 106b indicate normal Sp02 measurements, when the sensors 108a, 108b indicate normal expected movement and position, and when the sensors 110a and 110b fail to measure temperatures it can be deduced that a faceshield is in the up position away from the user's face. In this case, the other sensors 106a, 106b, 108a, 108b indicate that the PPE items actually are being worn, and the failure of the sensors 110a, 110b to register temperature in an expected range means that the sensors 110a, 110b are distanced from the wearer's body due to the "up" position of the faceshield. For a faceshield that does not have a positional up/down capability the same sensor outputs would indicate an error condition in the temperature sensors.

Considering another scenario, when the sensors 106a, 106b do not provide Sp02 measurements, when the sensors 108a, 108b indicate normal expected movement and position, and when the sensors 110a and 110b indicate normal body temperatures it may be presumed that the sensors 106a, 106b are erroneous or inoperative. Notices and alerts can therefore be generated, and the wearer can be prompted to obtain a replacement PPE item that is fully functional for all of the sensors provided.

In still another example, when the sensors 106a, 106b indicate abnormal Sp02 measurements, when the sensors 108a, 108b indicate abnormal movement and position (or an unexpected absence of movement and position), and when the sensors 110a and 110b indicate an abnormal temperature, it can be deduced that the wearers are in physical distress and need help. Likewise, when the sensors 106a, 106b indicate normal Sp02 measurements, when the sensors 108a, 108b indicate abnormal movement and position, and when the sensors 110a and 110b indicate normal temperature the persons wearing the PPE item may have fallen. Self-deterministic evaluation and diagnosis of specific and distinct events can be made by the processors 104a, 104b as well as detections of error conditions that may trigger different notifications and alerts to be made via comparison of the sensor outputs and intelligent interpretation thereof.

In the example shown, each sensor unit 102a, 102b further includes a combination transmitter and receiver (i.e., a transceiver) 112a, 112b configured for short-range wireless communication with one another transceiver via known Bluetooth standards and protocol. Such Bluetooth transceivers are continuously seeking to communicate with another Bluetooth device and accordingly whenever the transceiver 112a is within signal range of the transceiver 112b the two devices may recognize one another via unique IDs provided to each device. The transceivers 112a, 112b are relatively low power devices and therefore promote longer battery life, although non-Bluetooth transceivers and communication protocols other than Bluetooth protocols are possible in other embodiments such as, for example only, Near Field Communication (NFC), Wi-Fi communication or communication established via Local Area Networking (LAN). In other cases, short range radio devices may be utilized having an extended signal range relative to Bluetooth devices when implemented in, for example, mesh network protocols and the like, and in still other cases long range signal transmission and higher power radio transmission of signals may be employed to communicate over long distances.

The transceivers 112a, 112b also allow aspects of PPE compliance to be evaluated in certain embodiments. For instance, the IDs of each transceiver can be correlated to the type or grade of PPE items to which it is embedded. As such, if transceiver 112a corresponds to a Level 1 type of PPE item corresponding to a first and lower level of risk, if it detects a signal from a transceiver 112b that corresponds to a Level 3 type of PPE item that corresponds to a much higher level of risk, it can be deduced that one of the persons wearing the PPE items has an improper type/level of PPE item for the area where the persons reside. In such a scenario a notification or an alert may be generated by the processor 104a and 104b. This case may also correspond to a person in an unauthorized location, and again a notification or alert can be generated.

The transceivers 112a, 112b may also allow proximity sensing of two persons each wearing the respective PPE items to assess proximity-based aspects of a safety protocol. In general, as the Bluetooth transceivers 112a, 112b operate they measure a Received Signal Strength Indicator (RSSI) level from other Bluetooth transceivers. Generally speaking, the closer the transceivers 112a, 112b are to one another the stronger the RSSI between them, and as the distance between them increases the RSSI level will become weaker until eventually they are out of signal transmission range with one another and therefore they cannot communicate any longer. Therefore, in the calibration of the devices, the RSSI level can be a good indicator of proximity of two persons when the PPE items including the transceivers 112a, 112b are worn.

In a contemplated embodiment, when the measured RSSI level is below a predetermined limit at least a predetermined amount of distance between the two persons can be deduced, but as the RSSI level approaches or exceeds a predetermined limit it can be deduced that the two persons are too close to another. Therefore, the processors 104a, 104b can determine and evaluate proximity compliance or non-compliance based on the measured RSSI levels of the transceivers 112a, 112b. In one example the RSSI limits utilized by the processors 104a, 104b may be determined to assess a 6 foot proximity limit between the persons to achieve desired distancing to reduce a possible transmission of COVID 19. Higher and lower proximity limits and settings are possible, however, to meet particular needs and achieve particular objectives.

If a proximity violation is detected (i.e., the two persons are too close to each other based on the RSSI values of the respective transceivers 112a, 112b) data and information can be recorded by the processor for contract tracing purposes. The unique IDs of each transceiver can be correlated with specific individuals for contact tracing purposes to manage possible outbreaks or epidemics of sickness or disease in the monitored locations. Of course, the same data and contact tracing may also be used to confirm other aspects of compliance such as confirming that all required persons in a group of workers are actually present in the desired proximity to one another while a task or procedure is being performed, or alternatively to identify a missing one of the required workers. The contact tracing capability can be used to confirm required interactions between certain workers or persons or alternatively to identify an unexpected or unauthorized interaction of workers that may be problematic from a safety perspective.

Feedback indicators 114a, 114b may also be provided for use by the persons wearing the PPE items including the sensor devices 102a, 102b. In contemplated embodiments the indicators 114a, 114b may be one or more illumination elements that are operable to emit different colored light (e.g., red/green/blue (RGB) light emitting diodes (LEDs) that may be operable to emit different colors of light or the indicators 114a, 114b may be respectively different lighting elements each respectively providing a single color light that are selectively illuminated to achieve desired color coded notifications to other persons wearing the PPE items such that each worker may see and confirm the status for other respective workers that are present.

In a simple example, an emitted red color from the feedback element 114a or 114b may indicate a proximity violation to another worker or provide a warning to another worker of a possibly unwell person that is being encountered, while a green light indicates to another worker that proper distancing is being maintained or that the person being encountered is well. In further and/or alternative embodiments additional feedback elements such as audio elements or haptic elements may be provided to notify or alert the persons of detected issues. The feedback indicators provided may be positioned in any location on the PPE item so they may recognized by sight, sound or tactile sensation in order for other persons wearing the PPE items to act accordingly in response. For instance, when a first worker observes a red light notification from the PPE item worn by a second worker, the first worker can move away from the second worker to cure a detected proximity violation, can make appropriate inquiries to the second worker, can provide instruction to the second worker, and/or seek or render appropriate aid or assistance to the second worker. Flashing light signals or combinations of feedback lights may be implemented in a coded manner to represent different detected events or different gradations of detected conditions that can be decoded by trained workers who observe them.

In some cases, the feedback indicators 114a, 114b may be separately provided from the intelligent PPE items themselves when the PPE items may not be easily seen or observed by other workers. In the example of a headband or faceshield, however, the feedback indictors 114a, 114b may be positioned more or less at eye level and therefore can be integrated in the design of the PPE item. For other types of PPE items that are worn on parts of the body other than the face and head and are therefore not as readily observable, a separately provided set of indicators 114a, 114b may be advisable that can be worn at a more readily observable location, including but not limited to locations near the wearer's head or face.

It is understood that additional sensors may be provided in the sensor units 102a, 102b or externally provided to meet the needs of certain end uses and applications. For example, an electromagnetic field (EMF) detector 116 may be provided to assist an electrical worker. The electromagnetic field detector may sense a presence of a magnetic field induced by electrical current flow in a conductor and therefore may assist the worker in knowing whether or not a component or machinery in an electrical power system is "live" or energized when conducting a maintenance or service procedure. External temperature sensors and other environmental sensors may also be provided to assist workers in assessing risks in taking any particular action.

As further illustrated in FIG. 1, a Bluetooth gateway device 120 is within signal range of the transceivers 112a, 112b to collect sensor data and information and any request or notification data from the processors 104a, 104b. The Bluetooth gateway device 120 then sends to the collected data and information to a remotely located computer server device 130 storing information in a database. The stored data and information on the server device 130 (or in a database associated with the server device) may, in turn, be accessed through computer devices for review in graphical information dashboard displays 140 that can quickly be used to assess wellness and PPE compliance across a community of persons being monitored through wearable PPE items. The dashboard displays may be accessed, for example, by authorized users via an Internet portal established by a smart phone device or another computing device (e.g., a tablet device or a notebook/laptop computer) as desired. Alerts and notifications may be presented to such smart phone or computing devices via any form or medium desired in an active or passive alert (e.g., email, SMS text notification, voice message, push notification, etc.). In some cases, analysis of data to generate notification and alerts could be made on the server side instead of the processors 104a, 104b in the sensor devices 102a, 102b. Archiving of data and sophisticated reports may be generated to assess worker wellness, compliance with safety protocols, and to diagnose and troubleshoot issues in the sensor system.

While two sensor devices 102a, 102b and one gateway device 120 are shown, the system is scalable to include any number n of sensor units and gateway devices 120 distributed about a monitored area. In contemplated embodiments the sensor units 102a, 102b provide data and information in more or less real time to the gateway device(s) 120 present. In other embodiments, however, the data can be collected and stored and communicated to the gateway device 120 in a batch process. In some cases, the sensor devices 102a, 102b may include a connector port facilitating data transmission to the gateway via a connected cable. In some embodiments the sensor devices 102a, 102b may communicate with a smart phone device that in turn may communicate with the gateway device 120 or directly communicate with the server 130. Since some hazardous locations do not permit smart phone devices, however, the architecture illustrated does not depend on smart phone devices and is particularly well suited for conventionally hazardous environments.

The sensor units 102a, 102b and the components described in contemplated embodiments are packaged in respective housings for assembly to a PPE item in a manner wherein the components may reliably perform the functions described. The components described may be arranged on a circuit board internal to the housings provided. The operation of the biometric sensors will require some access to the person's body in order to operate and as such portions of the sensors may be located on the exterior surface of the housings so that the biometric sensors may operate with respect to exposed skin of the person to measure SpO2 and body temperature as described above. Alternatively, openings or apertures may be provided in the housings for the sensor devices to operate on exposed skin of the wearer.

When applied to different types of PPE items, the sensors in the sensor units 102a, 102b may be exposed to different parts of the human body in an in unobtrusive manner. In a contemplated example, the sensors may be located on the forehead and/or temple areas when the PPE items are worn on the person's head. In a further example, multiple sensor units 102a, 102b may be provided at different locations on the user's head in the same PPE item to make biometric measurements at different locations that can be compared to one another for still further sophistication in the device intelligence or to provide communication capabilities in different locations to avoid signal blocking by the human body that may otherwise occur to disrupt communication with another intelligent PPE device worn by another person.

In another example, the sensor units 102a, 102b may be exposed to other parts of the body such as the wrist for effective monitoring in an unobtrusive manner and therefore may be incorporated in a wristband or in a glove. Different types of biometric sensors may be provided in different types of housings for use with different types of PPE items worn on different areas of the body. More than one intelligent wearable PPE item may be worn by the same person to provide further degrees of redundancy and data outputs that may be compared to one another to confirm events of interest and to detect error conditions in specific components.

In some instances, the sensors described can be separately provided from the housings including the processors and interconnected by wires or cables so that, for example, a sensor or sensors may be positioned proximate a user's forehead while the processor and transceiver may be positioned near the temples of the person's head to minimize any possible instruction in the field of view of the person wearing the PPE. Sensors may therefore be distributed amongst different locations on the person's body as desired to most effectively and reliably measure the respective biometric parameters or to measure the same parameters at different locations on the person's body to compare results and undertake health checks of the system.

Also, in some instances additional non-biometric sensors such as the electromagnetic field detection sensor 116 described above may be desirably located at a location other than the head of the wearer but still may desirably communicate with the processor 104a or 104b. As such, a cable may extend to another part of the body where the electromagnetic field detection sensor is more desirably located. Wireless communication of external sensor data to the processors 104a, 104b is also possible, and in such case an electromagnetic field detector may be provided in glove or in a tool or other implement that can wirelessly communicate with the processor 104a or 104b or may communicate directly with a gateway device 120. As such, special purposes sensor units having different components and form factors may be provided for different purposes that may communicate with one another or with a gateway device 120 when desired.

Having described sensor units and devices, and also applicable operating algorithms functionally per the description above, those in the art may accordingly implement the algorithms via programming of the controllers or other processor-based devices. Such programming or implementation of the concepts described is believed to be within the purview of those in the art and will not be described further. While an exemplary architecture has been described, variations are possible and the system architecture set forth is made for the purposes of illustration rather than limitation.

Figure 2:
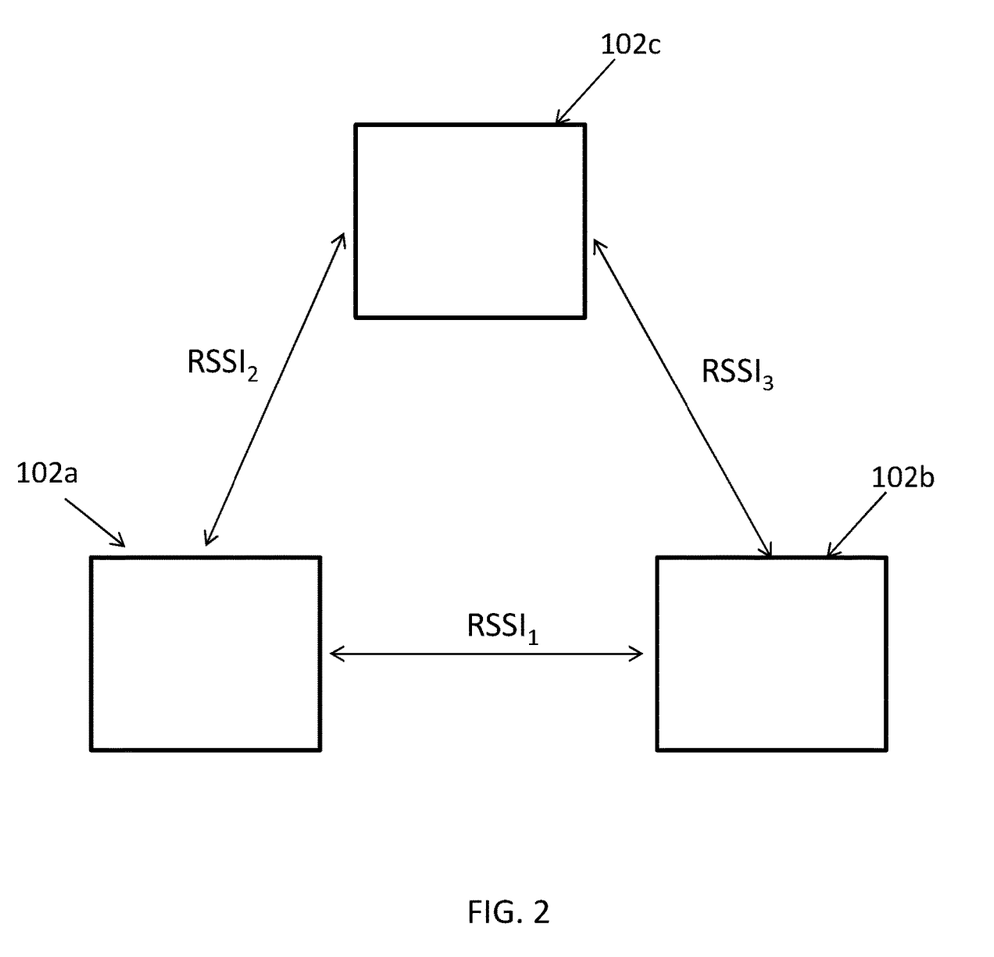
FIG. 2 schematically illustrates exemplary proximity sensing performed in the system of FIG. 1.

FIG. 2 illustrates aspects of the proximity detection performed in the system 100. As shown in FIG. 2, three sensor units 102a, 102b and 102c are shown in signal range with one another and are in communication with one another via the Bluetooth transceivers described above. It is assumed in FIG. 2 that the sensor units 102a, 102b and 102c are embedded in PPE items being worn by different persons. Sensor unit 102a communicates with sensor unit 102b with a first RSSI value shown as $RSSI_1$ that as explained above correlates to the distance between the units 102a and 102b. Sensor unit 102a communicates with sensor unit 102c with a second RSSI value shown as $RSSI_2$ that as explained above correlates to the distance between the units 102a and 102c. Sensor unit 102b communicates with sensor unit 102c with a third RSSI value shown as $RSSI_3$ that as explained above correlates to the distance between the units 102b and 102c.

RSSI values $RSSI_1$, $RSSI_2$, and $RSSI_3$ in theory would be approximately the same when the corresponding distances between the transceivers in the units 102a, 102b, 102c are approximately the same. Also in theory, the RSSI values $RSSI_1$, $RSSI_2$, and $RSSI_3$ would be different as the sensor units are distanced by unequal amounts. When such theoretical assumptions are in fact realized the system may reliably perform proximity sensing based on the measured RSSI values.

In practice, however, the measured RSSI values $RSSI_1$, $RSSI_2$, and $RSSI_3$ are subject to fluctuation and variation in use that can obscure accurate deduction of distances as described above based on the theoretical assumption that stronger RSSI values correspond to closer distance while weaker RSSI values correspond to greater distances. Factors affecting RSSI measurements include varying degree of antenna sensitivity in the transceivers utilized, device orientation, environmental conditions and obstructions in signal paths. Because of this, at least in some usage conditions two transceivers in communication with one another may measure the RSSI value differently at different times even while the distance between them has not changed. Such inconsistent or variable RSSI measurements may, in turn, lead to false positives and false negatives in the proximity sensing when applying the predetermined calibration limit (s) described above. This can cause the feedback indicators 114 described above to report conflicting indications or to quickly switch on and off to provide inconsistent indications in certain conditions. Such issues can further be complicated when the persons wearing the transceivers in the PPE items are moving. Confusing or incoherent feedback indication to the persons wearing the PPE items is inherently undesirable and therefore further measures are sometimes needed.

A first solution to mitigate variation in RSSI measurements that is employed in the system 100 is to consider the measured RSSI levels $RSSI_1$, $RSSI_2$, and $RSSI_3$ over distinct time periods until a reliable measurement is obtained. As one example, if at least a number n of RSSI samples are measured below the calibrated RSSI limit threshold over a predetermined time window t a compliant proximity can be deduced (i.e., the persons are sufficiently distanced) and the indicator 114 may be activated to display a green feedback signal. The processor will continuously monitor the RSSI measurements in the same manner over another and subsequent period of time t and if the same result is obtained the indicator 114 will continue to display the green feedback signal.

If the number n of RSSI samples are not measured below the calibrated RSSI limit threshold over a predetermined time window t a noncompliant proximity can be deduced (i.e., the persons are too close to another another) and the indicator 114 may be activated to display a red feedback signal. The processor will continuously monitor the RSSI measurements in the same manner over another period of time t and if the same result is obtained the indicator 114 will continue to display the red feedback signal. In a contemplated example once noncompliant proximity is determined and the indicator is red, non-compliance will continue to be deduced and the indicator will continue to display red until zero of the RSSI samples in a subsequent time window t are measured. Once this occurs, the proximity is deemed compliant again the indicator 114 is reset to indicate green. As such, once a noncompliant proximity is established the system may exhibit a bias toward noncompliance until a strong indication is obtained that the noncompliance no longer exists. It is contemplated, however, that the time period to determine noncompliance may be different from the time window needed to determine compliance again wherein the indicator 114 can be reset. If a shorter window is used for the reset function the system will reset more quickly and if the window is longer the system will reset more slowly. Any non-compliant proximity event may be recorded by the sensor units and reported to the gateway device 120 in the system 100.

As such in the example above the processors look for some stability in the measured RSSI values over predetermined windows of time before making any decisions concerning noncompliant proximity that evens out any tendency to produce a false positive or false negative. By strategically selecting values of the number n and the time t different sensitivities may be realized in the proximity sensing being monitored. The higher the number n generally correlates with a more reliable determination. In contemplated embodiments the time period t is relatively short and is on the order of few seconds. Actual values of n and t selected need to strike a balance between reliable proximity sensing in a shorter time frame that may assess movement of the persons and therefore timely provide reliable feedback to the persons needing monitoring without being overly sensitive. For example, considering two persons moving in opposite directions that may breach the proximity limit only in passing in a short time period the system may be calibrated so as not to detect or record this event, but if two persons working together inadvertently move too closely together the system may promptly notify them and display red feedback, while timely responding and providing green notification when the workers self-correct in view of the notification provided.

Following the example described above further, if no signal is received the RSSI will be zero and the indicator 114 will be turned off. The indicator will stay off until an RSSI is again measured and the indicator can be switched on to display green. As long the measured RSSI stays below the limit the indicator 114 will stay green. If two persons stay sufficiently distanced no red indication will be provided as no proximity violation will be detected. Recurring monitoring of the RSSI levels according to n and t values will detect a violation if it occurs and red indication will be provided until the system resets as described above.

Additional RSSI measurements that may enhance proximity sensing include filtering or analyzing the RSSI measurements to account for antenna sensitivity, device orientation and environmental conditions, as well as analysis to detect transient signal issues or permanent obstruction in signal paths. A transient signal issue may be the result of a person standing between two other persons and creating an obstructed signal path or otherwise interfering with communications of the transceivers, an opening or closing of a door, or persons standing on opposing sides of machinery. A permanent obstruction in signal paths may exist in the presence of a wall, a ceiling or a floor. By observing RSSI data that that the sensor units can collect, RSSI dead spots or weak signal areas can be taken into account to fine tune the system and avoid false positives and negatives based on the locations of the workers in certain areas. As such, the values n and t in the sensing technique described above can desirably change as persons enter or leave certain areas.

The approaches above can be further validated via changes in movement or displacement by each person being monitored by virtue of the output of the IMU units provided. Like the features described above, redundancy is provided from different reference points to confirm detected events or to detect error conditions. Inconsistent indicators via the various different sensors and proximity detection techniques allows for intelligent self-deterministic behavior of the sensor units and diagnostic capability to conduct health checks and detect error conditions attributable to specific components to ensure reliable system operation and avoid false positive and false negative in the detection events of concern.

Having described sensor units and devices, and also applicable operating algorithms functionally per the description above, those in the art may accordingly implement the algorithms via programming of the controllers or other processor-based devices. Such programming or implementation of the concepts described is believed to be within the purview of those in the art and will not be described further. While an exemplary architecture has been described, variations are possible and the system architecture set forth is made for the purposes of illustration rather than limitation.

Figure 3:
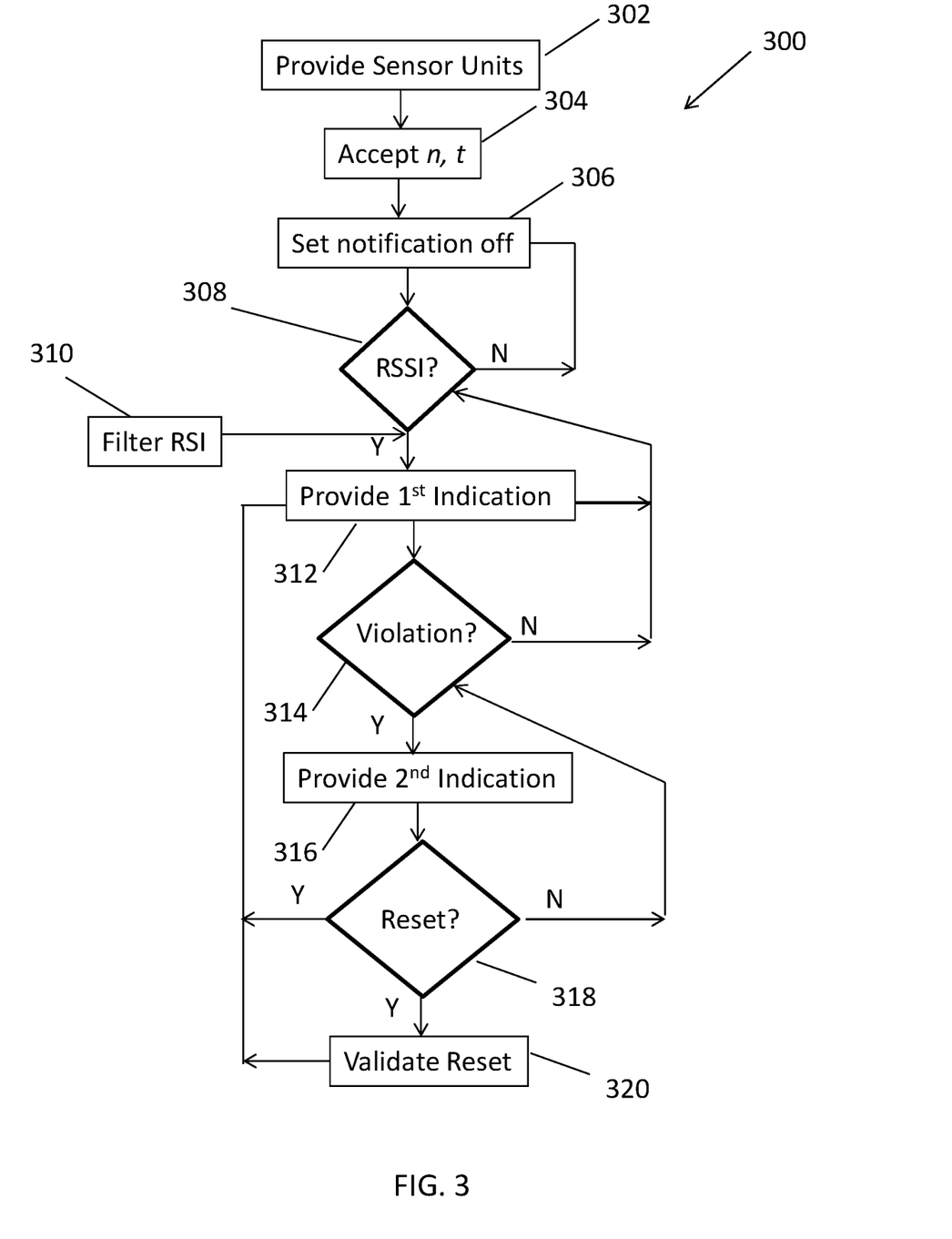
FIG. 3 is a method flowchart for exemplary proximity sensing in the system of FIG. 2.

FIG. 3 is a method flowchart of exemplary processes 300 implemented in and executed by the system and controls of the sensor units shown in FIGS. 1 and 2. The process 300 assumes that the system 100 as described above has been implemented with sensor units 102 embedded in wearable items such as the PPE items described above, and that gateway devices 120 are in place to communicate with the sensor units 102 of wearable items worn by different persons. The compilation or collection of data and information in device memory or database storage ((i.e., worker IDs, wearable item IDs, transceiver IDs, RSSI thresholds, gateway IDs, location information, task information, access authorization credentials, contact information for notices and alerts, etc.) is also presumed as a preparatory step to provide the desired functionality of the system.

At step 302, the sensor units are provided such as the sensor units described above including the transceivers described. For purposes of step 302 the sensor units are also embedded in wearable items such as the PPE items described above for use in the monitoring system.

At step 304 the proximity sensing sensitivity parameter values n and t are accepted. Such parameters may be pre-set in the sensor units by the manufacturer, selected by the installer, or selected by a system overseer to adjust operation of the sensor units provided. The parameters may be selected globally across all the sensor units in the system, in subgroups of sensor units, or individually. As mentioned above, different n and t parameters may be accepted for different locations or areas within the same facility and as such step 304 may also include the various different sets of n and t that the system should preferably apply.

At step 306 the notification is set to off. That is, the indication element 114 (or other indication elements that may be provided) are inactive to provide any feedback to the wearers of the PPE items being monitored. Steps 302, 304, 306 are considered preparatory, initialization steps to the performance of the remainder of the method 300 that is executed while the wearable items are being worn by workers. The sensor units are presumed to be switched on and operating to communicate with other sensor units within signal range as workers move about in the monitored area, and at step 308 each unit awaits for an RSSI to be detected from another sensor unit of another worker attempting to establish communicate with it.

At step 308, if no RSSI is detected, the sensor unit returns to step 306 and to step 308, continuing waiting for RSSI with the notification deactivated. If RSSI is detected, an optional filtering or RSSI analysis may be applied to enhance processing at step 310, and at step 312 the notification is turned on and a first notification (e.g., green light) is provided. In some embodiments, the notification may be provided at step 312 only when the RSSI measured exceeds a predetermined level to avoid excessive notifications of persons at distances well outside concerns of the proximity monitoring limits and corresponding distances (e.g., six foot distancing requirements) that is desirably maintained by persons wearing the PPE items.

At step 314, the parameters of n and t are applied to evaluate whether a proximity violation has occurred as described above. If no violation is found at step 314, the unit returns to step 308 and continues to assess RSSI. If the conditions for a proximity violation exist, at step 316 a second notification is provided (e.g., red light). From step 316 the conditions required for a reset are evaluated at step 318.

If the required conditions for reset exist at step 318, such as those described above, the system returns to step 312 and provides the first indication (e.g., green light). Optionally, at step 320 the reset conditions may be validated by feedback from another one of the sensors before returning to step 312 and changing the indication being provided (e.g., red light). If the reset condition cannot be validated by another sensor, the second notification from step 316 may continue to be displayed. The validation at step 320 desirably provides additional assurance that the detected proximity violation has been removed by actions of the persons wearing the PPE, validation of reset conditions may in some cases be considered an optional feature and need not be implemented.

In the systems, sensor unit devices and methods of the invention, the biometric sensors are located proximate strategic areas of the body, such as the face and head to gather vital statistics of the wearer. For example, one or more of the biometric sensors may be positioned over the superficial temporal artery of the wearer. This is a major artery of the head arising from the external carotid artery when it splits into the superficial temporal artery and maxillary artery, facilitating measurements of pulse and oxygen saturation levels. Other locations of sensors are likewise possible to take the biometric measurements on various different portions of the body via various different items of PPE including the sensor units and components described. Seamless integration of biometric and processor-based controls is realized to intelligently monitor and manage personal wellness and PPE protocol compliance in a highly reliable and objective manner for more effective oversight and management of personal safety issues in a community of persons for the various different applications and needs described.

The indication elements in each wearable item may likewise be activated by the processor-based controls when certain events are detected other than proximity violation as described above, and such indication may likewise be observed by other workers for confirmatory status of the respective worker as well or unwell, to identify a worker that is not sufficiently protected, to identify improper use of PPE items and violations of protocol, etc. Appropriate steps can therefore be taken by other workers to address an unwell worker or to mitigate noncompliance with protocols. Workers can therefore perform tasks in groups or as individuals with higher degrees of situational awareness of events that are otherwise extremely difficult for the workers to possess, as well as provide a higher assurance of safety from hazards while performing tasks.

The systems and methods may further include generation of alerts and notices of detected conditions in addition to worker feedback provided by the indication elements. Alerts and notifications may be presented, for example, to smart phones or computing devices via any form or medium desired in an active or passive alert (e.g., email, SMS text notification, voice message, push notification, etc.). In some cases, analysis of data to generate notification and alerts could be made on the server side instead of the processors 104a, 104b in the sensor devices 102a, 102b. Archiving of data and sophisticated reports may be generated to assess worker wellness, compliance with safety protocols, and to diagnose and troubleshoot issues in the sensor system.

In some cases, an alert or notification may be directed to an unwell worker or a worker that is not in compliance without necessarily being reliant upon other workers present to tell them that they are unwell or are not in compliance based on observation of the feedback elements. Of course, it is possible that multiple feedback elements may be provided in the PPE items, some of which are geared to signaling to other workers of detected conditions and some of which are geared to signaling to the person wearing the PPE item of a detected condition. With respect to detected proximity violations, notices can be generated and sent to affected persons if such detected proximity violations are not cured in a predetermined time period.

Detected events by the system, including related data and information details (e.g., worker ID, device ID, transceiver ID, date, time, location, etc.) are communicated, saved and stored by the system, and detailed reports may therefore be generated for study of the worker behavior with respect to proximity violations, effectiveness of applicable PPE protocols, and also the operation of the system itself. Troubleshooting and optimizing of the proximity detection, PPE protocols, and the system operation are therefore possible.

The algorithmic processes and associated functionality described above can be implemented in application software running on the processor-based devices and computing devices described herein. The PPE compliance and wellness monitoring systems and processes of the invention, as described above for an electrical power system or another industrial environment or in any setting described above that are traditionally or non-traditionally considered hazardous for personnel may further be implemented in multiple components distributed among a plurality of sensing devices, gateway devices, server devices and computing devices. One or more components may be in the form of computer-executable instructions embodied in a computer-readable medium. The systems and processes are not limited to the specific embodiments described herein, however. In addition, components of each device, each system, and each process can be practiced independently and separately from other components and processes described herein. Each component and process can also be used, however, in combination with other devices, systems and processes as desired.

The above-described examples of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the described embodiments above. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

Having described devices and applicable operating algorithms functionally per the description above, those in the art may accordingly implement the algorithms via programming of the controllers or other processor-based devices. Such programming or implementation of the concepts described is believed to be within the purview of those in the art and will not be described further.

The benefits and advantages of the inventive concepts are now believed to have been amply illustrated in relation to the exemplary embodiments disclosed.

A personal wellness monitoring system has been disclosed including first and second processor-based devices respectively possessed by a first worker and a second worker. The first processor-based device includes a first transceiver and a first indication element, and the second processor-based device includes a second transceiver and a second indication element. Each of the first and second processor-based devices is configured to: determine a proximity compliance or a proximity violation between the first and second workers based on a received signal indication strength (RSSI) of the respective first or transceiver; and operate the respective first or second indication element to confirm the determined proximity compliance and the determined proximity violation for observation by the other of the respective first or second workers.

Optionally, the first and second transceivers may be respectively embedded in a first and second wearable item. A combination of sensors may be embedded in each of the first and second wearable item, wherein the combination of sensors include an oximeter sensor, an infrared thermopile sensor, and an inertial measurement unit. The first and second wearable item may be a personal protective equipment item, with the personal protective equipment item being selected from a group consisting of a head covering, a face covering, a neck protector, an ear protector, a protective garment, a glove, and a footwear item. The system may further include a gateway device receiving data and information from the first and second transceiver, and a remote computing device in communication with the gateway device.

As further options, the first and second processor-based devices may determine the proximity compliance or the proximity violation by comparing the received signal strength to a predetermined threshold. The first and second processor-based devices may also sample the received signal strength indication over a first predetermined time period, and determine a proximity compliance if a predetermined first number n of the samples are below the predetermined threshold. The first and second processor-based devices may continue to sample the received signal strength indication over a second predetermined time period, and determine a proximity violation if a predetermined second number n of the samples are above the predetermined threshold. After determining a proximity violation, the first and second processor-based devices may continue to sample the received signal strength indication over a third predetermined time period, and reset the proximity violation if a third predetermined number n of the samples falls below the predetermined threshold. The second number n and the third number n may be unequal. The second number n may be greater than the third number n, and the third number n may be zero. The second and third predetermined time periods may also be unequal. The first and second processor-based devices may be configured to validate the reset of the proximity violation in reference to an inertial measurement unit.

The first and second processor-based devices may also be configured to filter or analyze RSSI measurements to account for antenna sensitivity, device orientation and environmental conditions. Each of the first and second indication elements may include at least one light emitting element. The first and second indication elements may emit a green light to confirm the proximity compliance, and the first and second indication elements may emit a red light to confirm the proximity violation. The first and second transceivers may be Bluetooth transceivers. The system may further include an electromagnetic field sensor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A personal wellness monitoring system comprising:
first and second processor-based devices respectively possessed by a first worker and a second worker;
the first processor-based device including a first transceiver and a first indication element, wherein the first transceiver is associated with a first identifier, wherein the first identifier of the first transceiver indicates a first level of protection associated with the first processor-based device;
the second processor-based device including a second transceiver and a second indication element, wherein the second transceiver is associated with a second identifier, wherein the second identifier indicates a second level of protection associated with the second processor-based device;
wherein each of the first and second processor-based devices is configured to:
determine a proximity compliance or a proximity violation of the first worker or the second worker based on a received signal strength indication (RSSI) of the first transceiver or the second transceiver;
determine a protection compliance or a protection violation of the first worker or the second worker based on a comparison of the first identifier of the first transceiver indicating the first level of protection associated with the first processor-based device and the second identifier of the second transceiver indicating the second level of protection associated with the second processor-based device; and
operate the first indication element or the second indication element to confirm the determined proximity compliance or the determined proximity violation and the determined protection compliance or the determined protection violation.

2. The system of claim 1, wherein the first and second transceivers are respectively embedded in a first and second wearable item.

3. The system of claim 2, further comprising a combination of sensors embedded in each of the first and second wearable item, wherein the combination of sensors include an oximeter sensor, an infrared thermopile sensor, and an inertial measurement unit.

4. The system of claim 3, wherein the first and second wearable item is a personal protective equipment item, the personal protective equipment item being selected from a group consisting of a head covering, a face covering, a neck protector, an ear protector, a protective garment, a glove, and a footwear item.

5. The system of claim 3, further comprising a gateway device receiving data and information from the first and second transceiver.

6. The system of claim 5, further comprising a remote computing device in communication with the gateway device.

7. The system of claim 1, wherein the first and second processor-based devices determine the proximity compliance or the proximity violation by comparing the RSSI to a predetermined threshold.

8. The system of claim 7, wherein the first and second processor-based devices sample the received signal strength indication over a first predetermined time period, and determine a proximity compliance if a predetermined first number n of the samples are below the predetermined threshold.

9. The system of claim 8, wherein the first and second processor-based devices continue to sample the received signal strength indication over a second predetermined time period, and determine a proximity violation if a predetermined second number n of the samples are above the predetermined threshold.

10. The system of claim 9 wherein the first and second processor-based devices, after determining a proximity violation, continue to sample the received signal strength indication over a third predetermined time period, and reset the proximity violation if a third predetermined number n of the samples falls below the predetermined threshold.

11. The system of claim 10, wherein the second number n and the third number n are unequal.

12. The system of claim 11, wherein the second number n is greater than the third number n.

13. The system of claim 12, wherein the third number n is zero.

14. The system of claim 10, wherein the second and third predetermined time periods are unequal.

15. The system of claim 10, wherein each of the first and second processor-based devices are configured to validate the reset of the proximity violation in reference to an inertial measurement unit.

16. The system of claim 1, wherein the first and second processor-based devices are configured to filter or analyze RSSI measurements to account for antenna sensitivity, device orientation and environmental conditions.

17. The system of claim 1, wherein each of the first and second indication elements comprise at least one light emitting element.

18. The system of claim 17, wherein the first and second indication elements emit a green light to confirm the proximity compliance, and wherein the first and second indication elements emit a red light to confirm the proximity violation.

19. The system of claim 1, wherein the first and second transceiver are Bluetooth transceivers.

20. The system of claim 1, further comprising an electromagnetic field sensor.

* * * * *